(12) United States Patent
Ma et al.

(10) Patent No.: US 12,552,773 B2
(45) Date of Patent: Feb. 17, 2026

(54) COMPOUND FOR SPECIFICALLY ENHANCING SPATIAL COUPLING DEGREE OF TRPV4-KCa2.3 COMPLEX AND USE THEREOF

(71) Applicant: Jiangnan University, Wuxi (CN)

(72) Inventors: Xin Ma, Wuxi (CN); Chunlei Tang, Wuxi (CN); Shaying Yang, Wuxi (CN)

(73) Assignee: Jiangnan University, Wuxi (CN)

( * ) Notice: Subject to any disclaimer, the term of this patent is extended or adjusted under 35 U.S.C. 154(b) by 1059 days.

(21) Appl. No.: 17/585,705

(22) Filed: Jan. 27, 2022

(65) Prior Publication Data

US 2022/0144804 A1 May 12, 2022

Related U.S. Application Data

(63) Continuation of application No. PCT/CN2021/101376, filed on Jun. 22, 2021.

(30) Foreign Application Priority Data

Nov. 9, 2020 (CN) .......................... 202011240790.2

(51) Int. Cl.
*C07D 401/12* (2006.01)
*A61P 9/12* (2006.01)
*C07D 241/04* (2006.01)
*C07D 403/12* (2006.01)

(52) U.S. Cl.
CPC .............. *C07D 401/12* (2013.01); *A61P 9/12* (2018.01); *C07D 241/04* (2013.01); *C07D 403/12* (2013.01)

(58) Field of Classification Search
CPC .................................................. C07D 401/12
See application file for complete search history.

(56) References Cited

FOREIGN PATENT DOCUMENTS

| CN | 102304104 A | 1/2012 |
|---|---|---|
| CN | 107056715 A | 8/2017 |
| CN | 112390782 A | 2/2021 |
| WO | 2009140517 A1 | 11/2009 |

OTHER PUBLICATIONS

Ambinter, American Chemical Society Chemical Abstracts Service Registry No. 327042-56-8, available Mar. 14, 2001 (Year: 2001).*
Aurora Fine Chemicals, American Chemical Society Chemical Abstracts Service Registry No. 2208519-88-2, available Apr. 9, 2018 (Year: 2018).*
American Chemical Society Chemical Abstracts Service Registry No. 1793932-88-3, available Jul. 5, 2015 (Year: 2015).*
American Chemical Society Chemical Abstracts Service Registry No. 2203110-39-6, available Apr. 1, 2018 (Year: 2018).*
CAS. "RN" Reg 27, Jun. 27, 2019 p. 1-48.

* cited by examiner

*Primary Examiner* — John S Kenyon
*Assistant Examiner* — Sara Elizabeth Bell
(74) *Attorney, Agent, or Firm* — IPRO, PLLC; Na Xu

(57) ABSTRACT

The present disclosure provides a compound for specifically enhancing the spatial coupling degree of a TRPV4-KCa2.3 complex and use thereof, and belongs to the field of chemical medicine. The compound with a structure shown in a general formula (I) in the present disclosure is mainly used for re-coupling two uncoupled proteins and restoring the proteins to a normal state under uncoupling of TRPV4 and KCa2.3 in hypertensive patients. Under normal conditions of the TRPV4 and the KCa2.3, a signal of calcium ions is received by the TRPV4. As the calcium ions flow in, potassium ions in a KCa2.3 channel in the downstream are stimulated to flow out. Due to depolarization, vasodilation is caused, and therefore, the blood pressure of the hypertensive patients is returned to a normal level.

7 Claims, 5 Drawing Sheets

COMPOUND FOR SPECIFICALLY ENHANCING SPATIAL COUPLING DEGREE OF TRPV4-KCa2.3 COMPLEX AND USE THEREOF

TECHNICAL FIELD

The present disclosure belongs to the field of chemical medicine, and specifically relates to a compound for specifically enhancing the spatial coupling degree of a TRPV4-KCa2.3 complex and use thereof.

BACKGROUND

As a class of non-selective cation channel proteins, transient receptor potential (TRP) ion channels are found in a visual conduction system of *Drosophila melanogaster* for the first time. At present, nearly 30 types of TRP channels have been found in mammals and are divided into 7 subfamilies including TRPV (vanniloid), TRPM (melastatin), TRPA (ankryin), TRPML (mucolipin), TRPP (polycistin), TRPC (caninocal) and TRPN (drosophila NOMPC) ([J] Arch. 2011 May; 461(5):493-498). The TRP channels are used for adjusting the permeability of extracellular cations according to changes of environment temperature, chemicals, pH values and osmotic pressure (Int. J. Biochem. Cell Biol. 2016; 78:217-228.), thereby regulating cell functions. As a member of the TRPV subfamily of the TRP channel family, a transient receptor potential vanilloid type 4 (TRPV4) channel is widely expressed in epithelial cells, macrophages, airway smooth muscle cells and other cells of the respiratory tract, can be activated by various stimulants, such as pH, temperature, arachidonic acid and osmotic pressure, and plays an important role in many physiological and pathological processes. Great attention has been paid to functions of the channel in endothelial cells. The channel has many vascular functions, including response to blood flow shear force, regulation of angiotasis, mechanical signal transduction and angiogenesis.

KCa2.3 is a small-conductance calcium ion-activated potassium channel. Under physiological conditions, when the cells are stimulated, the TRPV4 channel is opened, and calcium ions flow in. As a result, the KCa2.3 channel in the downstream is opened, and potassium ions flow out. Therefore, polarization of the membrane potential tends to occur, and vasodilation is caused. Studies have found that patients with hypertension, obesity and other cardiovascular diseases are more likely to have TRPV4 dysfunction. Under the condition of the hypertension, the coupling between the TRPV4 and the KCa2.3 is reduced, resulting in decrease of the vasodilation ability. However, a new idea is provided for development of new drugs for treatment of the hypertension by screening out a small molecule that can enhance the coupling between the TRPV4 and the KCa2.3 from vasoactive substances. As the TRPV4 is widely expressed, it is related to the pathogenesis of many diseases. Epithelial and endothelial barriers are characterized by having tight and adhesive connections between cells, and these connections control the exchange of fluids and proteins from the vascular system to surrounding tissues. Due to injuries (such as under pathological conditions or during mechanical injuries), the integrity of the barriers is reduced, and uncontrolled movement of the fluids and plasma proteins through intercellular spaces is caused, resulting in formation of edema. However, the integrity of the epithelial and endothelial barriers may be reduced by activation of the TRPV4, indicating that the TRPV4 may play a role in the formation of the edema under inflammation or tissue injuries. The TRPV4 is widely expressed in the entire gastrointestinal tract, including ileum and colon tissues, DRG neurons and fine nerve fibers associated with submucosal and subserosal blood vessels (Gastroenterology. 2008 June; 134(7):2059-69.; Neurogastroenterol Motil. 2012 November; 24(11):e557-60.). In fact, compared with a healthy control group, colitis is associated with increased expression of the TRPV4 in colon tissues and intestinal epithelial cells in humans and mice. Compared with patients without the colitis, the serosa and serosal blood vessels of patients with the colitis are more innervated by TRPV4 positive sensory nerves. The TRPV4 channel is expressed in urothelium and detrusor cells of rats and mice (J. Mol. Neurosci. 2013; 51:602-614.). When TRPV4-mediated $Ca^{2+}$ flows in, BK and SK channels may be activated, resulting in reduced bladder contraction and an extended storage period (Med Sci (Basel). 2019 May 22; 7(5). pii: E67.). The TRPV4 channel in the urothelium and detrusor of the bladder plays an important role in bladder functions. The upstream of the TRPV4 channel may be the TRPV4 expressed in neurons, astrocytes and neuroglia cells. The TRPV4 channel is used for sensing the pressure of the bladder and transmitting a signal to the brain, thereby regulating functions of the detrusor. The TRPV4 is also widely expressed in epithelial cells of the lung. A TRPV4 inhibitor is regarded as a non-negligible part for treatment of pulmonary arterial hypertension in the future. The progression of the edema can be prevented by administration of the TRPV4 inhibitor before myocardial infarction. Moreover, the reduction of the edema is promoted after the myocardial infarction (Sci Transl Med. 2012 Nov. 7; 4(159):159ra148.). When the TRPV4 is activated, the downstream of PAR2, histamine and 5-hydroxytryptamine receptors is stimulated (Am J Physiol Renal Physiol. 2010 March; 298(3):F692-F701. Biochem Biophys Res Commun. 2001 Aug. 3; 285 (5):1250-2.). It is interesting that functional loss of the TRPV4 in mice will not lead to any obvious sensation and muscle or inflammatory phenotype (J Biol Chem. 2010 Aug. 27; 285(35):27176-81.). However, various human TRPV4 mutations are associated with different inflammation phenotypes, metabolism and musculoskeletal diseases (J Physiol. 2019 February; 597(4):997-1021.). As the TRPV4 plays a basic and extensive role in normal physiological activity, it has become an interesting and complex potential pharmacological target.

Recently, the TRPV4 has been identified as a key regulator for the integrity of the endothelial barriers and a promising pharmacological target (Balakrishna, et al., 2014; Hamanaka, et al., 2010; Hamanaka, et al., 2007; Jian, et al., 2008; Jie, et al., 2015; Thorneloe, et al., 2012). In the cardiovascular system, the TRPV4 channel is mainly expressed in endothelial cells, vascular smooth muscle cells, perivascular nerves and cardiac fibroblasts to sense hemodynamic changes, thereby maintaining balance in the body (J Cardiovasc Pharmacol. 2013 February; 61(2):113-9.). When the activity of the TRPV4 is reduced, a blood flow-induced vascular response is reduced. When the TRPV4 is activated, hyperpolarization of membranes of the vascular smooth muscle cells is caused. In this case, when $Ca^{2+}$ flows in through the TRPV4 channel, the $Ca^{2+}$ sensitive $K^+$ channel in the vascular smooth muscle cells is stimulated, and then the hyperpolarization of the smooth muscle is caused (Biochim Biophys Acta. 2007 August; 1772(8):907-14.).

As a non-selective TRPV4 inhibitor, ruthenium red has been used in early studies and has various effects. New selective TRPV4 inhibitors include RN-1734, widely used HC-067047 and orally bioavailable GSK2193874. The latest TRPV4 pharmacological inhibitor has high affinity and specificity. In fact, the TRPV4 inhibitor has been successfully used in the body without obvious side effects (Am J Physiol Lung Cell Mol Physiol. 2014 Jul. 15; 307(2):L158-72.; Sci Transl Med. 2012 Nov. 7; 4(159):159ra148.). In addition, phase I and II clinical trials of a new TRPV4 antagonist have been carried out recently, and preliminary results have been announced (GSK2798745; NCT02119260). A GlaxoSmithKline inhibitor GSK2798745 (clinicaltrials.gov NCT02119260) is the first item in a human trial. It has been reported that a GSK2193874 compound has a positive result and no side effects. Therefore, results of this trial are expected (Sci Transl Med. 2012 Nov. 7; 4(159): 159ra147.). Two clinical studies have been further conducted. A phase I study is used for validating a method for evaluating pulmonary edema, with an ultimate goal of testing a TRPV4 inhibitor (NCT02135861) under this situation. A phase II study is used for evaluating the effect of a TRPV4 inhibitor (NCT02497937) on pulmonary gas transfer and respiration of patients with congestive heart failure. GSK2193874 can be used for effectively preventing the pulmonary edema of mice caused by acute and chronic heart failure.

In addition, pyrrolidine sulfonamide analogs, pharmaceutical compositions containing the same and use thereof as TRPV4 antagonists have been described in international patent applications EP20170784400 and EP20170784691 recently. According to US201816217948, a method for treating and/or preventing skin diseases is described, and a method for reducing skin inflammation, relieving pain and/or reducing itching in subjects in need is provided. According to JP20150014057, a TRPV4 (the member 4 of the subfamily V of the transient receptor potential cation channel) activator, a hypotensive preventive or improver, an autonomic neuromodulator, efficacy of the autonomic neuromodulator using the TRPV4 activator and an administration means thereof are described. In recent years, there are higher and more urgent needs for antihypertensive drugs with better curative effects, fewer side effects, high metabolic stability and great bioavailability. How to overcome the shortcomings of existing antihypertensive drugs with non-specific targets and many side effects is a problem to be solved urgently at present.

SUMMARY

Technical problem to be solved: The present disclosure provides a small molecule that can specifically restore coupling of TRPV4 and KCa2.3 uncoupled under the condition of hypertension. A new therapeutic target is provided for treatment of the hypertension, and more options are provided for clinical medication of patients with the hypertension. In addition, a new option is also provided for combined medication during treatment of the hypertension, and possible side effects during use can be effectively avoided. In the present disclosure, by searching for a structural domain of interaction sites of an endothelial cell ion channel complex TRPV4-KCa2.3, a specific compound that can act on the two sites is prepared. It is found that the compound can enhance the spatial coupling degree of the TRPV4-KCa2.3 complex and has a great meaning in research and development of antihypertensive drugs.

A first objective of the present disclosure is to provide a compound with a structure shown in a general formula (I) or a pharmaceutically acceptable salt thereof,

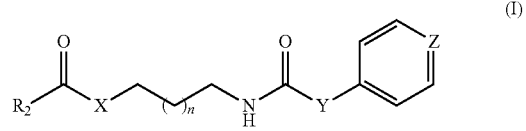

where,

X is selected from NH, O and $CH_2$;

Y is selected from NH and $CH_2$;

Z is selected from N and $CR_1$;

$R_1$ is selected from

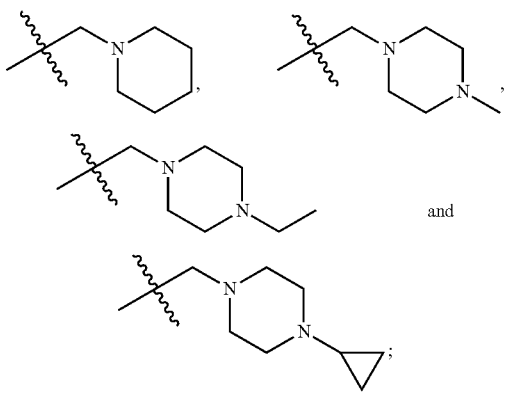

$R_2$ is selected from (i) an unsubstituted phenyl or a phenyl substituted with a substituent, where the substituent is one or more optionally selected from a halogen, a $C_1$-$C_8$ haloalkyl and a cyano for substitution; (ii) an N-arylamino, where the aryl is an unsubstituted phenyl or a phenyl substituted with a substituent, and the substituent is one or more optionally selected from a halogen, a $C_1$-$C_8$ haloalkyl and a cyano for substitution; and (iii)

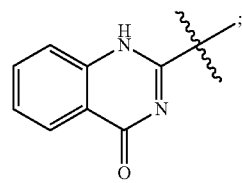 [SMILES: *c1nc(=O)c2ccccc2[nH]1]

and n is 0, 1, 2, or 3.

In an implementation of the present disclosure, when the $R_2$ is an unsubstituted phenyl or a phenyl substituted with a substituent, the substituent is one or more optionally selected from a halogen, $CF_3$, $CHF_2$, $CH_2F$ and CN for substitution.

In an implementation of the present disclosure, when the $R_2$ is an N-arylamino, the aryl is an unsubstituted phenyl or a phenyl substituted with a substituent, and the substituent is one or more optionally selected from a halogen, $CF_3$, $CHF_2$, $CH_2F$ and CN for substitution.

In an implementation of the present disclosure, when the Z is N, the $R_2$ is

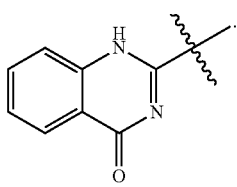 [SMILES: *c1nc(=O)c2ccccc2[nH]1]

In an implementation of the present disclosure, when the Z is CR$_1$, the R$_2$ is selected from (i) an unsubstituted phenyl or a phenyl substituted with a substituent, where the substituent is one or more optionally selected from a halogen, a C$_1$-C$_8$ haloalkyl and a cyano for substitution; (ii) an N-arylamino, where the aryl is an unsubstituted phenyl or a phenyl substituted with a substituent, and the substituent is one or more optionally selected from a halogen, a C$_1$-C$_8$ haloalkyl and a cyano for substitution; and (iii)

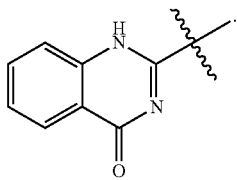 [SMILES: *c1nc(=O)c2ccccc2[nH]1]

In an implementation of the present disclosure, the pharmaceutically acceptable salt is an inorganic salt or an organic salt. The inorganic salt is selected from a hydrochloride, a hydrobromide, a hydroiodide, a perchlorate, a sulfate, a bisulfate, a nitrate, a phosphate and an acid phosphate. The organic salt is selected from a formate, an acetate, a trifluoroacetate, a propionate, a pyruvate, a glycolate, an oxalate, a malonate, a succinate, a glutarate, a fumarate, a maleate, a lactate, a malate, a citrate, a tartrate, a methanesulfonate, an ethanesulfonate, a benzenesulfonate, a salicylate, a p-toluenesulfonate and an ascorbate. Furthermore, the pharmaceutically acceptable salt is selected from a hydrochloride, a succinate and a methanesulfonate.

Further, the compound shown in the general formula (I) or a salt thereof may be isolated in the form of a solvate. Therefore, any such solvate belongs to the scope of the present disclosure.

The present disclosure further provides a pharmaceutical composition comprising the compound with the structure shown in the general formula (I) or a pharmaceutically acceptable salt thereof and a pharmaceutically acceptable carrier, an excipient, or a diluent.

In an implementation of the present disclosure, the pharmaceutical composition is prepared by mixing the compound shown in the general formula (I) or a pharmaceutically acceptable salt thereof and a pharmaceutically acceptable carrier, an excipient, or a diluent. In a unit dosage form (such as a tablet or a capsule), the content of the compound shown in the general formula (I) or a pharmaceutically acceptable salt thereof may be 0.01-1,000 mg, such as 0.05-800 mg, 0.1-500 mg, 0.01-300 mg, 0.01-200 mg, 0.05-150 mg and 0.05-50 mg.

The composition of the present disclosure can be prepared into a conventional pharmaceutical preparation according to a conventional preparation method. For example, the composition can be prepared into a tablet, a pill, a capsule, a powder, a granule, an emulsion, a suspension, a dispersion, a solution, a tincture, a syrup, an ointment, a drop, a suppository, an inhalant, a spray and the like.

In an implementation of the present disclosure, the compound or a pharmaceutically acceptable salt thereof in the present disclosure can be prepared into a solid preparation for oral administration, including, but not limited to, a capsule, a tablet, a pill, a powder and a granule. In these solid dosage forms, the compound shown in the general formula (I) in the present disclosure as an active ingredient is mixed with at least one conventional inert excipient (or a carrier), such as sodium citrate or dicalcium phosphate, or mixed with one or more selected from:

(1) a filler or a solubilizer, such as starch, lactose, sucrose, glucose, mannitol and silicic acid;
(2) an adhesive, such as hydroxymethyl cellulose, an alginate, gelatin, polyvinylpyrrolidone, sucrose and Arabic gum;
(3) a humectant, such as glycerin;
(4) a disintegrant, such as agar, calcium carbonate, potato starch, tapioca starch, alginic acid, some required silicates and sodium carbonate;
(5) a retarding solvent, such as paraffin wax;
(6) an absorption accelerator, such as a quaternary ammonium compound;
(7) a wetting agent, such as cetyl alcohol and glyceryl monostearate;
(8) an adsorbent, such as kaolin; and
(9) a lubricant, such as talc, calcium stearate, solid polyethylene glycol and sodium lauryl sulfate or a mixture thereof. The capsule, the tablet and the pill may also contain a buffer.

In an implementation of the present disclosure, the solid dosage form such as a tablet, a sugar pill, a capsule, a pill and a granule can be obtained by using a coating, a shell material such as an enteric coating and other materials known in the art for crystal coating or microencapsulation. The solid dosage form may contain an opacifying agent. In addition, the active ingredient in the composition may be released in a certain part of the digestive tract in a delayed manner. Examples of an available embedding component include polymers and waxes. The active ingredient can also be prepared into a microcapsule with one or more of the excipients above when necessary.

In an implementation of the present disclosure, the compound or a pharmaceutically acceptable salt thereof in the present disclosure can be prepared into a liquid dosage form for oral administration, including, but not limited to, a pharmaceutically acceptable emulsion, a solution, a suspension, a syrup and a tincture. In addition to the compound shown in the general formula (I) or a pharmaceutically acceptable salt thereof as an active ingredient, the liquid dosage form may include an inert diluent conventionally used in the art, such as water and other solvents, solubilizers and emulsifiers. For example, the liquid dosage form may include ethanol, isopropanol, ethyl carbonate, ethyl acetate, propylene glycol, 1,3-butanediol, dimethylformamide and oils, especially cottonseed oil, peanut oil, corn oil, olive oil, castor oil, sesame oil and a mixture of these substances. In addition to these inert diluents, the liquid dosage form of the present disclosure may include a conventional auxiliary, such as a wetting agent, an emulsifier, a suspending agent, a sweetener, a flavoring agent and a perfume.

In an implementation of the present disclosure, the suspension includes, for example, ethoxylated stearyl alcohol, polyoxyethylene sorbitol, sorbitan, microcrystalline cellulose, agar and a mixture of these substances.

In an implementation of the present disclosure, the compound and a pharmaceutically acceptable salt thereof in the present disclosure can be prepared into a dosage form for parenteral injection, including, but not limited to, a physiologically acceptable sterile aqueous or non-aqueous solution, a dispersion, a suspension, an emulsion and a sterile powder for redissolving into a sterile injectable solution and dispersion. A suitable carrier, diluent, solvent, or excipient includes water, ethanol, a polyol and a suitable mixture thereof.

In an implementation of the present disclosure, the compound or a pharmaceutically acceptable salt thereof in the present disclosure can be prepared into a dosage form for topical administration, including, for example, an ointment, a powder, a suppository, a drop, a spray and an inhalant. The compound shown in the general formula (I) or a pharmaceutically acceptable salt thereof in the present disclosure as an active ingredient is mixed with a physiologically acceptable carrier, an optional preservative, a buffer and a required propellant when necessary under sterile conditions.

The compound or a pharmaceutically acceptable salt thereof in the present disclosure can be administered separately or in combination with other pharmaceutically acceptable therapeutic agents, especially in combination with other antihypertensive drugs.

In an implementation of the present disclosure, the therapeutic agent includes but is not limited to: diuretic antihypertensive drugs, such as hydrochlorothiazide in thiazides, spironolactone in aldosterones and furosemide in loop diuretics; sympatholytics, mainly such as propranolol; inhibitors affecting the renin-angiotensin system, such as captopril and benazepril in angiotensin converting enzyme (ACE) inhibitors; angiotensin II receptor blockers, such as valsartan; and calcium channel ion blockers, such as amlodipine. The ingredients to be combined can be administered simultaneously or sequentially in the form of a single preparation or different preparations. The combination includes not only a combination of the compound of the present disclosure and one or more of other active agents, but also a combination of the compound of the present disclosure and two or more of other active agents.

Another objective of the present disclosure includes use of the compound with the structure shown in the general formula (I) or a pharmaceutically acceptable salt thereof in preparation of drugs for treatment of hypertension, hyperlipidemia, coronary heart disease, angina pectoris, myocardial infarction, sudden death, arrhythmia, idiopathic pulmonary arterial hypertension, cardiac ion channel disease, coronary artery ectasia, homozygous familial hypercholesterolemia, idiopathic cardiomyopathy and sitosterolemia in mammals.

The present disclosure has the following beneficial effects.

A series of small molecules with low toxicity and high activity are obtained, and great experimental results at the animal level are obtained. Compared with classic similar drugs, the pharmaceutical composition has no obvious difference in efficacy, and a relatively ideal result is obtained.

DETAILED DESCRIPTION

Figure 1:
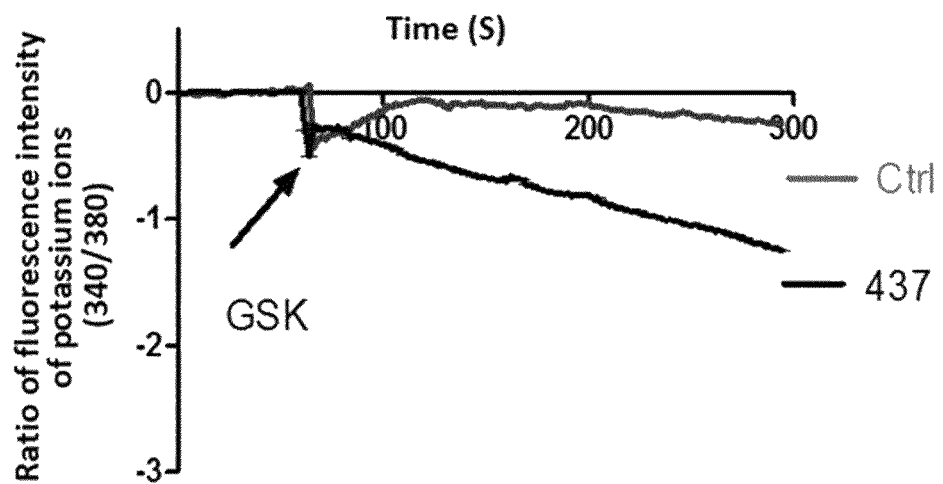
FIG. 1 is a diagram showing changes of [K$^+$] corresponding to a compound (437) in Example 4.

In the present disclosure, the halogen includes fluorine, chlorine, bromine and iodine.

In the present disclosure, "  " indicates that a substituent is connected from here.

In the present disclosure, "a pharmaceutically acceptable salt" refers to a salt retaining biological effectiveness and properties of a parent compound. The term "salt" refers to any salt of the compound of the present disclosure prepared from an inorganic or organic acid or base and an internally formed salt. Generally, the salt has a physiologically acceptable anion or cation.

As used herein, the term "disease" refers to any symptom or disorder that damages or interferes with normal functions of cells, organs, or tissues.

As used herein, the term "antihypertensive drug" refers to any agent useful in treatment of hypertension.

As used herein, the term "pharmaceutically acceptable" refers to a component that has a reasonable benefits/risk ratio and is applicable to being in contact with tissues of humans and other mammals without excessive toxicity, irritation, allergic reaction and the like in a reasonable medical scope. The term "a pharmaceutically acceptable salt" refers to any non-toxic salt that can directly or indirectly provide the compound of the present disclosure or a prodrug of the compound after being administered to a subject.

As used herein, the term "effective amount" or "effective therapeutic amount" refers to a sufficient amount of the compound or the pharmaceutical composition described herein to achieve the intended use, including, but not limited to, treatment of diseases. In some embodiments, the amount is a detected effective dosage for enhancing the coupling between TRPV4 and KCa2.3. The amount is affected by the severity, stage and progression of the hypertension. For example, the effective therapeutic amount can be changed according to the intended use in vitro or in vivo, the condition and severity of disease, the age and weight of a subject, or an administration method and the like. For example, the term is also applicable to inducing target cells according to electrophysiological activity of the cells. For example, the specific dosage is determined according to selection of a specific compound, the species of a subject, the age/existing health condition or health risk of the subject, an administration route, the severity of disease, combined administration with other agents, an administration time, administered tissues and an administration device and the like.

In the present disclosure, the term "administration" or "administering" of a compound refers to providing the compound of the present disclosure to an individual requiring treatment.

The compound of the present disclosure may have one or more asymmetric centers. Therefore, the compound may be in the form of a racemate, a mixture of racemates, a single enantiomer, a separate diastereomer and a mixture of diastereomers. All the isomeric forms of these compounds are clearly included in the present disclosure. The compound of the present disclosure may also have various tautomer forms. In this case, all the tautomer forms of the compound described herein are clearly included in the present disclosure. All the isomeric forms of these compounds are included in the present disclosure. All crystalline forms of the compound described herein are clearly included in the present disclosure.

In the present disclosure, the term "optionally selected from" or "optionally" indicates that a following described event or situation may or may not occur, and the description includes occurrence of the event or situation and non-occurrence of the event or situation. For example, the description that the ethyl is "optionally" substituted with a halogen indicates that the ethyl may be an unsubstituted group (such as CH$_2$CH$_3$), a monosubstituted group (such as CH$_2$CH$_2$F), a polysubstituted group (such as CHFCH$_2$F and CH$_2$CHF$_2$) and a fully substituted group (such as CF$_2$CF$_3$). Those skilled in the art may understand that any substitution or substitution pattern that is impossible in space and/or cannot be synthesized will not be introduced into any group containing one or more of substituents.

The term "implementation", "embodiment", "in another embodiment", "in some embodiments", or "in some implementations of this application" described throughout the specification indicates that at least one embodiment includes specific reference elements, structures, or features related to the embodiment. Therefore, the phrases "in an embodiment", "in embodiments", "in another embodiment", "in some embodiments" and "in some implementations of this application" in various places throughout the specification do not necessarily refer to the same embodiment. In addition, the specific elements, structures, or features may be combined in one or more embodiments in any suitable manner.

Unless otherwise required in this application, throughout the specification and the following claims, the words "comprise" and English variants thereof such as "comprises" and "comprising" shall be interpreted as open-ended and inclusive, that is "including but not limited to".

It should be understood that unless otherwise clearly specified, the singular article "a" (corresponding to English "a", "an" and "the") used in the specification of this application and the appended claims includes plural objects.

Example 1

4-oxo-N-(3-(2-(pyridin-4-yl)acetamido)propyl)-1,4-dihydroquinazoline-2-carboxamide

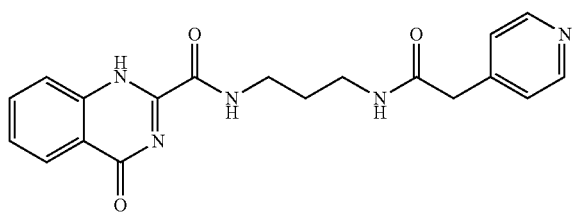 [SMILES: O=C(Cc1ccncc1)NCCCNC(=O)c1nc(=O)c2ccccc2[nH]1]

A synthesis method was as follows:

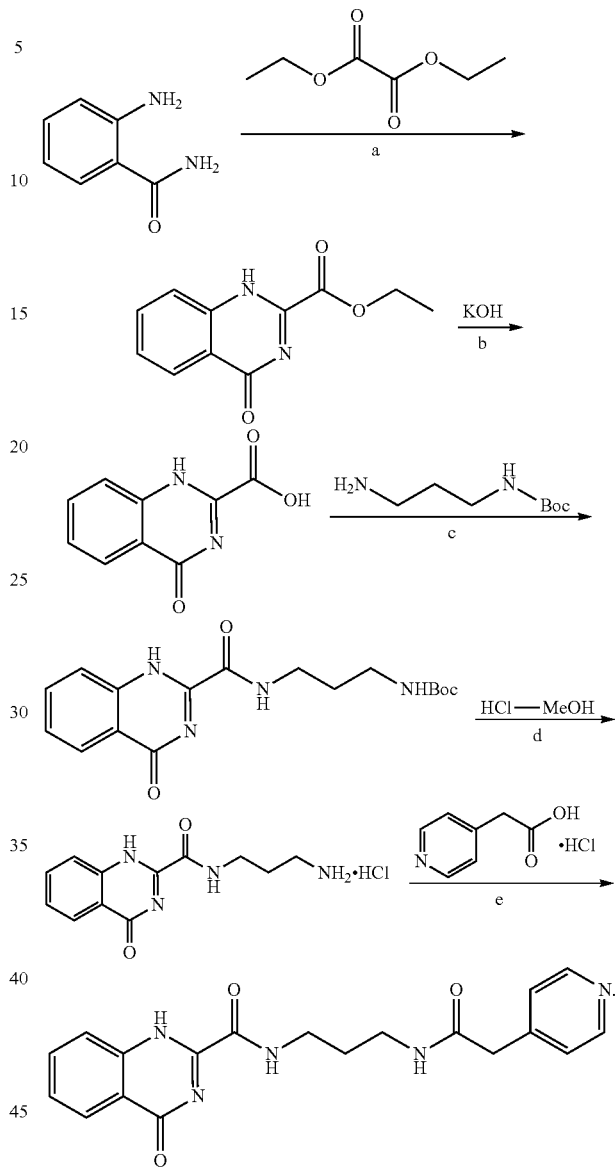

Step a: Preparation of ethyl 4-oxo-1,4-dihydroquinazoline-2-carboxylate 2-aminobenzamide (10 g, 73.53 mmol) was suspended in diethyl oxalate (100 mL) to obtain a suspension, the suspension was slowly heated to 185° C. for reflux for 5 hours and then cooled to room temperature, a solid was precipitated out, filtration was conducted, and a filter cake was washed with petroleum ether and then dried to obtain 13 g of a white solid with a yield of 86%.

Step b: Preparation of 4-oxo-1,4-dihydroquinazoline-2-carboxylic Acid

The ethyl 4-oxo-1,4-dihydroquinazoline-2-carboxylate (2 g, 9.2 mmol, 1.0 eq) was suspended in tetrahydrofuran (20 mL) and water (10 mL), and potassium hydroxide (1.5 g, 27.5 mmol, 3.0 eq) was added for stirring at room temperature for 2 hours. Ethanol was removed by rotary evaporation, a reaction solution was cooled to 0° C., the pH was adjusted to 2-3 with dilute hydrochloric acid, a solid was precipitated out, and then filtration and drying were conducted to obtain 1.2 g of a white solid with a yield of 69%.

Step c: Preparation of tert-butyl (3-(4-oxo-1,4-dihydroquinazoline-2-formamido)propyl)carbamate The 4-oxo-1,4-dihydroquinazoline-2-carboxylic acid (1 g, 5.26 mmol, 1.0 eq) was dissolved in DMF (10 mL), and N-tert-butoxycarbonyl-1,3-propanediamine (1.1 g, 6.31 mmol, 1.2 eq), MCI (1.51 g, 7.89 mmol, 1.5 eq), HOBt (1.06 g, 7.89 mmol, 1.5 eq) and triethylamine (0.8 g, 7.89 mmol, 1.5 eq) were sequentially added for stirring at room temperature for 18 hours. A reaction solution was diluted with ethyl acetate, washed with water 3 times, washed with saturated sodium chloride 1 time, dried with anhydrous sodium sulfate and then concentrated to obtain 0.85 g of a white solid with a yield of 47%.

Step d: Preparation of N-(3-aminopropyl)-4-oxo-1,4-dihydroquinazoline-2-carboxamide hydrochloride The tert-butyl (3-(4-oxo-1,4-dihydroquinazoline-2-formamido)propyl)carbamate (500 mg, 1.44 mmol) was dissolved in methanolic hydrochloric acid (5 mL) for stirring at room temperature for 3 hours and then concentrated to obtain 380 mg of a white solid with a yield of 93%.

Step e: Preparation of 4-oxo-N-(3-(2-(pyridin-4-yl)acetamido)propyl)-1,4-dihydroquinazoline-2-carboxamide The N-(3-aminopropyl)-4-oxo-1,4-dihydroquinazoline-2-carboxamide hydrochloride (100 mg, 1.77 mmol, 1.0 eq) was dissolved in DMF (2 mL), and 4-pyridineacetic acid hydrochloride (367.4 mg, 2.12 mmol, 1.2 eq), MCI (510 mg, 2.65 mmol, 1.5 eq), HOBt (357.7 mg, 2.65 mmol, 1.5 eq) and triethylamine (536.3 mg, 5.31 mmol, 3.0 eq) were sequentially added for stirring at room temperature for 18 hours. A reaction solution was diluted with ethyl acetate, washed with water 3 times, washed with saturated sodium chloride 1 time, dried with anhydrous sodium sulfate, concentrated and then purified with a column to obtain 32 mg of a white solid (4-oxo-N-(3-(2-(pyridin-4-yl)acetamido)propyl)-1,4-dihydroquinazoline-2-carboxamide) with a yield of 25%.

ESI-MS m/z: 366.1[M+H]$^+$, $^1$H NMR (400 MHz, DMSO-d$_6$) δ 12.13 (s, 1H), 9.04 (s, 1H), 8.47 (d, J=8.0 Hz, 2H), 8.18 (t, J=8.0 Hz, 2H), 7.89 (t, J=8.0 Hz, 1H), 7.78 (d, J=8.0 Hz, 1H), 7.61 (t, J=8.0 Hz, 1H), 7.27 (d, J=8.0 Hz, 2H), 3.47 (s, 2H), 3.32-3.25 (m, 2H), 3.15-3.10 (m, 2H), 1.72-1.66 (m, 2H).

Example 2

4-oxo-N-(3-(3-(pyridin-4-yl)ureido)propyl)-1,4-dihydroquinazoline-2-carboxamide

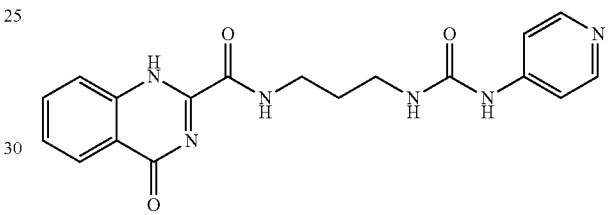

A synthesis method was as follows:

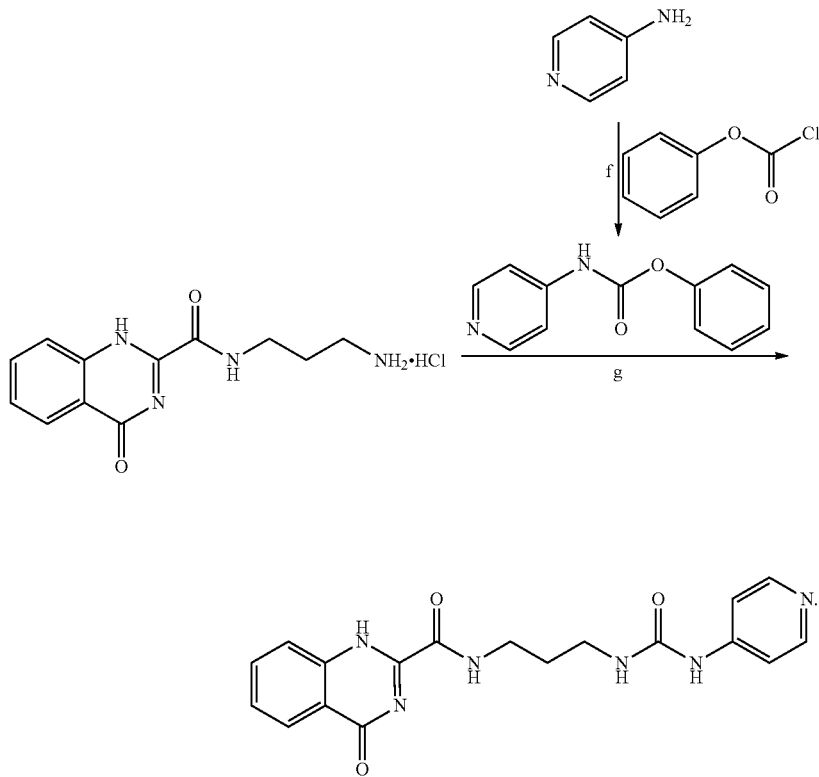

Step f: Preparation of phenylpyridin-4-yl Carbamate 4-aminopyridine (200 mg, 2.13 mmol, 1.0 eq) was dissolved in DMF (2 mL), triethylamine (257.9 mg, 2.55 mmol, 1.2 eq) was added, the temperature was lowered to 0° C., and phenyl chloroformate (399 mg, 2.55 mmol, 1.2 eq) was slowly added for a reaction at 0° C. for 3 hours. A reaction solution was diluted with ethyl acetate, washed with water 3 times, washed with saturated sodium chloride 1 time, dried with anhydrous sodium sulfate and then concentrated to obtain 365 mg of phenylpyridin-4-yl carbamate with a yield of 82%.

Step g: Preparation of 4-oxo-N-(3-(3-(pyridin-4-yl)ureido)propyl)-1,4-dihydroquinazoline-2-carboxamide N-(3-aminopropyl)-4-oxo-1,4-dihydroquinazoline-2-carboxamide hydrochloride (100 mg, 0.353 mmol, 1.0 eq) was dissolved in DMF (2 mL), and triethylamine (107.2 mg, 1.06 mmol, 3.0 eq) and the phenylpyridin-4-yl carbamate (90.6 mg, 0.424 mmol, 1.2 eq) were sequentially added for a reaction at room temperature for 18 hours. A reaction solution was diluted with ethyl acetate, washed with water 3 times, washed with saturated sodium chloride 1 time, dried with anhydrous sodium sulfate, concentrated and then purified with a column to obtain 20 mg of a white solid (4-oxo-N-(3-(3-(pyridin-4-yl)ureido)propyl)-1,4-dihydroquinazoline-2-carboxamide) with a yield of 15.4%.

ESI-MS m/z: 367.1[M+H]$^+$, $^1$H NMR (400 MHz, DMSO-d$_6$) δ 12.15 (s, 1H), 9.09 (s, 1H), 9.01 (s, 1H), 8.27 (d, J=8.0 Hz, 2H), 8.17 (d, J=8.0 Hz, 1H), 7.88 (d, J=8.0 Hz, 1H), 7.78 (d, J=8.0 Hz, 1H), 7.61 (t, J=8.0 Hz, 1H), 7.36 (d, J=4.0 Hz, 2H), 6.45 (t, J=4.0 Hz, 1H), 3.38-3.32 (m, 2H), 3.20-3.13 (m, 2H), 1.74-1.70 (m, 2H).

Example 3

N-(3-(3-(4-(((4-ethylpiperazin-1-yl)methyl)phenyl)ureido)propyl)-4-oxo-1,4-dihydroquinazoline-2-carboxamide

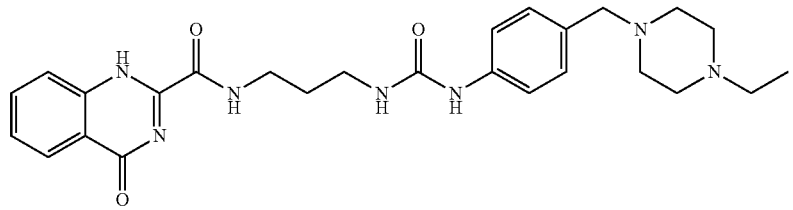 [SMILES: CCN1CCN(Cc2ccc(NC(=O)NCCCNC(=O)c3nc(=O)c4ccccc4[nH]3)cc2)CC1]

A synthesis method was as follows:

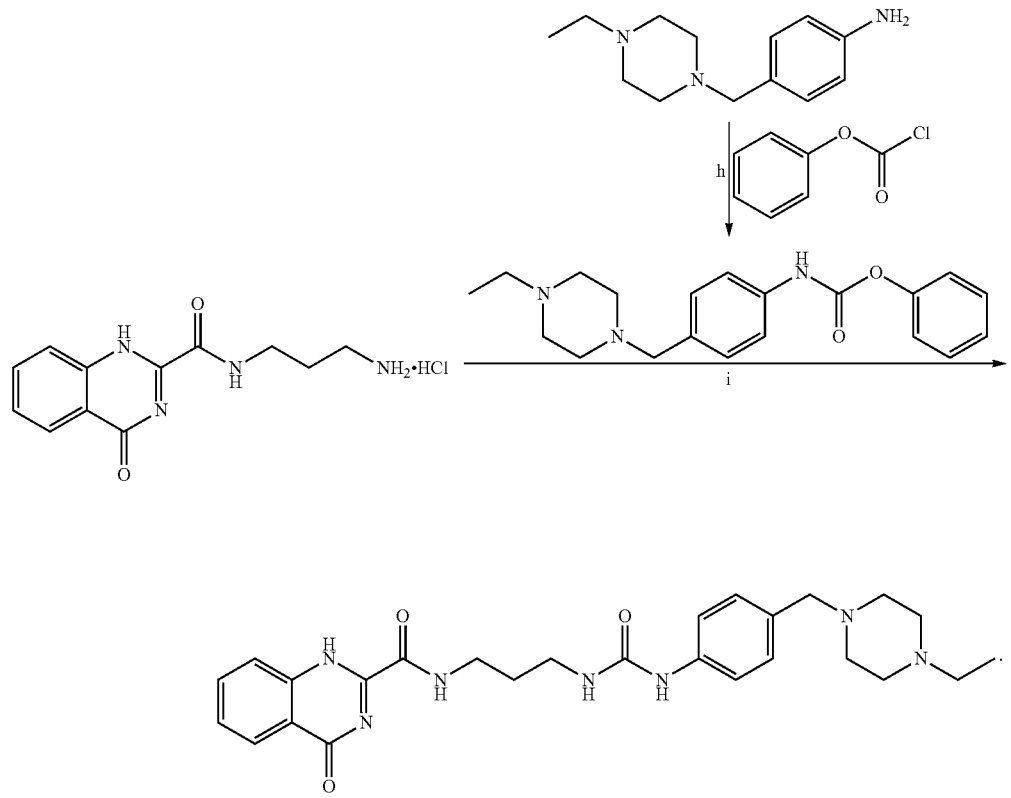

Step h: Preparation of phenyl(4-((4-ethylpiperazin-1-yl)methyl)phenyl)carbamate 4-(4-ethylpiperazin-1-methyl)-aniline (500 mg, 2.28 mmol, 1.0 eq) was dissolved in DMF (5 mL), triethylamine (345.9 mg, 3.42 mmol, 1.5 eq) was added, the temperature was lowered to 0° C., and phenyl chloroformate (391.2 mg, 2.51 mmol, 1.1 eq) was added dropwise for a reaction at room temperature for 2 hours. A reaction solution was diluted with ethyl acetate, washed with water, washed with saturated sodium chloride, dried with anhydrous sodium sulfate, concentrated and then subjected to column chromatography to obtain 480 mg of an oily product with a yield of 62%.

Step i: Preparation of N-(3-(3-(4-(((4-ethylpiperazin-1-yl)methyl)phenyl)ureido)propyl)-4-oxo-1,4-dihydroquinazoline-2-carboxamide N-(3-aminopropyl)-4-oxo-1,4-dihydroquinazoline-2-carboxamide hydrochloride (100 mg, 0.353 mmol, 1.0 eq) was dissolved in DMF (2 mL), and triethylamine (107.2 mg, 1.06 mmol, 3.0 eq) and the phenyl(4-((4-ethylpiperazin-1-yl)methyl)phenyl)carbamate (143.7 mg, 0.424 mmol, 1.2 eq) were sequentially added for a reaction at room temperature for 18 hours. A reaction solution was diluted with ethyl acetate, washed with water 3 times, washed with saturated sodium chloride 1 time, dried with anhydrous sodium sulfate, concentrated and then purified with a column to obtain 32 mg of a white solid (N-(3-(3-(4-(((4-ethylpiperazin-1-yl)methyl)phenyl)ureido)propyl)-4-oxo-1,4-dihydroquinazoline-2-carboxamide) with a yield of 18.4%.

ESI-MS m/z: 492.3 [M+H]+, 1H NMR (400 MHz, DMSO-$d_6$) δ 9.09 (s, 1H), 8.47 (s, 1H), 8.17 (d, J=8.0 Hz, 1H), 7.87 (d, J=8.0 Hz, 1H), 7.77 (d, J=8.0 Hz, 1H), 7.61 (t, J=8.0 Hz, 1H), 7.32 (d, J=8.0 Hz, 2H), 7.13-7.09 (m, 3H), 6.17 (t, J=4.0 Hz, 1H), 3.40-3.32 (m, 2H), 3.20-3.10 (m, 2H), 2.91 (s, 2H), 2.70-2.67 (m, 2H), 2.33-2.28 (m, 10H), 0.97 (t, J=8.0 Hz, 3H).

Example 4

5-(3-(4-((4-ethylpiperazin-1-yl)methyl)phenyl)ureido)-N-phenylpentaneamide

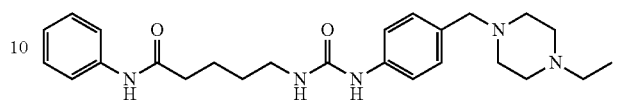

A synthesis method was as follows:

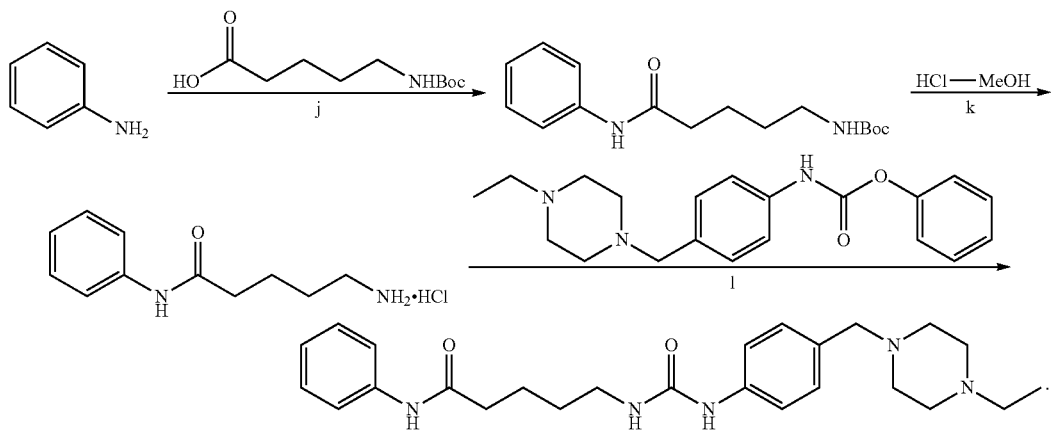

Step j: Preparation of tert-butyl (5-oxo-5-(phenylamino)pentyl)carbamate

Aniline (689 mg, 7.41 mmol, 1.0 eq) was dissolved in DMF (20 mL), and Boc-5-aminovaleric acid (1,930 mg, 8.89 mmol, 1.2 eq), EDCl (2,122 mg, 11 mmol, 1.5 eq) and HOBT (1,490 mg, 11 mmol, 1.5 eq) were sequentially added for stirring at room temperature for 18 hours. A reaction solution was diluted with ethyl acetate, washed with water, washed with saturated sodium chloride, dried with anhydrous sodium sulfate and then concentrated to obtain 1.8 g of tert-butyl (5-oxo-5-(phenylamino)pentyl)carbamate with a yield of 83%.

Step k: Preparation of 5-amino-N-phenylvaleramide Hydrochloride

The tert-butyl (5-oxo-5-(phenylamino)pentyl)carbamate (1 g, 3.42 mmol) was dissolved in a hydrochloric acid-methanol (10 mL) solution for stirring at room temperature for 3 hours and then concentrated to obtain 650 mg of 5-amino-N-phenylvaleramide hydrochloride with a yield of 83%.

Step l: Preparation of 5-(3-(4-((4-ethylpiperazin-1-yl)methyl)phenyl)ureido)-N-phenylpentaneamide The prepared 5-amino-N-phenylvaleramide hydrochloride (100 mg, 0.438 mmol, 1.0 eq) was dissolved in DMF (2 mL), and triethylamine (132.9 mg, 1.316 mmol, 3.0 eq) and phenyl(4-((4-ethylpiperazin-1-yl)methyl)phenyl)carbamate (178.2 mg, 0.525 mmol, 1.2 eq) were sequentially added for a reaction at room temperature for 18 hours. A reaction solution was diluted with ethyl acetate, washed with water 3 times, washed with saturated sodium chloride 1 time, dried with anhydrous sodium sulfate, concentrated and then purified with a column to obtain 23 mg of a white solid (5-(3-(4-((4-ethylpiperazin-1-yl)methyl)phenyl)ureido)-N-phenylpentaneamide) with a yield of 12%.

ESI-MS m/z: 438.3[M+H]$^+$, $^1$H NMR (400 MHz, CDCl$_3$) δ 8.20 (s, 1H), 7.53 (d, J=8.0 Hz, 2H), 7.27-7.25 (m, 3H), 7.18 (t, J=8.0 Hz, 3H), 7.07 (q, J=8.0 Hz, 2H), 5.42 (s, 1H), 3.45 (s, 2H), 3.24 (d, J=4.0 Hz, 2H), 2.50-2.36 (m, 12H), 1.71 (t, J=8.0 Hz, 2H), 1.52 (t, J=8.0 Hz, 2H), 1.09 (t, J=8.0 Hz, 3H).

Example 5

5-(3-(4-((4-ethylpiperazin-1-yl)methyl)phenyl) ureido)-N-(4-fluorophenyl)pentaneamide

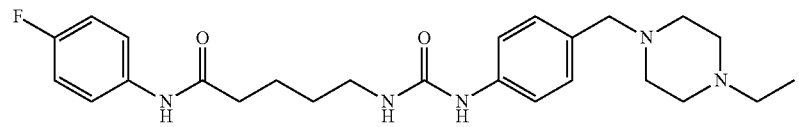 [SMILES: CCN1CCN(Cc2ccc(NC(=O)NCCCCC(=O)Nc3ccc(F)cc3)cc2)CC1]

A synthesis method was the same as that in Example 4, except that the aniline was replaced with p-fluoroaniline.

ESI-MS m/z: 456.3[M+H]$^+$, $^1$H NMR (400 MHz, DMSO-d$_6$) δ 9.92 (s, 1H), 8.34 (s, 1H), 7.61-7.58 (m, 2H), 7.30 (d, J=8.0 Hz, 2H), 7.13-7.09 (m, 4H), 6.11 (t, J=4.0 Hz, 1H), 3.34 (s, 2H), 3.10 (q, J=6.0 Hz, 2H), 2.51-2.21 (m, 12H), 1.61 (t, J=8.0 Hz, 2H), 1.45 (t, J=8.0 Hz, 2H), 0.97 (t, J=8.0 Hz, 3H).

Example 6

N-(5-(3-(4-(((4-ethylpiperazin-1-yl)methyl)phenyl) ureido)pentyl)-4-fluorobenzamide

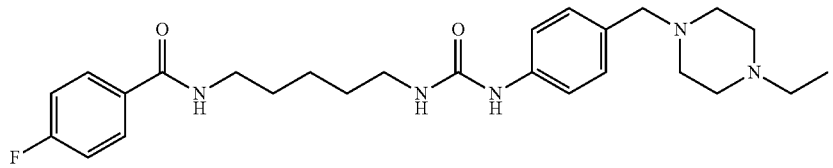 [SMILES: CCN1CCN(Cc2ccc(NC(=O)NCCCCCNC(=O)c3ccc(F)cc3)cc2)CC1]

A synthesis method was as follows:

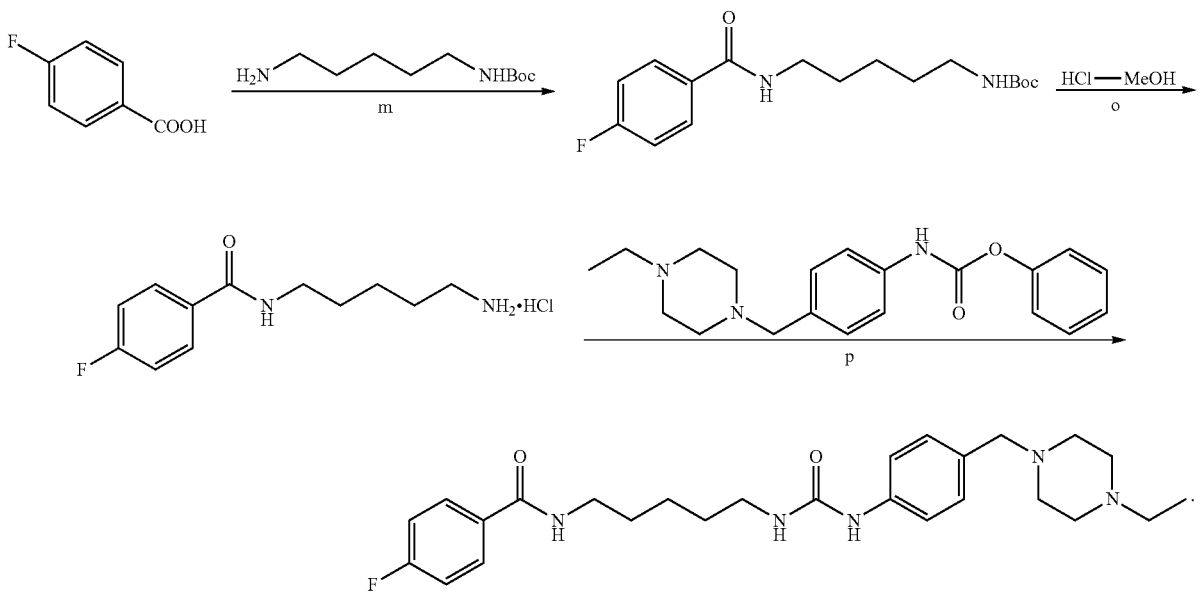

Step m: Preparation of tert-butyl (5-(4-fluorobenzamide)pentyl)carbamate

P-fluorobenzoic acid (560 mg, 4 mmol, 1.0 eq) was dissolved in DMF (10 mL), and tert-butyl N-(5-aminopentyl)carbamate (969.6 mg, 4.8 mmol, 1.2 eq), MCI (1,150 mg, 6 mmol, 1.5 eq) and HOBT (810 mg, 6 mmol, 1.5 eq) were sequentially added for stirring at room temperature for 18 hours. A reaction solution was diluted with ethyl acetate, washed with water, washed with saturated sodium chloride, dried with anhydrous sodium sulfate and then concentrated to obtain 1.0 g of tert-butyl (5-(4-fluorobenzamide)pentyl) carbamate with a yield of 77%.

Step n: Preparation of N-(5-aminopentyl)-4-fluorobenzamide Hydrochloride

The tert-butyl (5-(4-fluorobenzamide)pentyl)carbamate (1 g, 3.84 mmol) was dissolved in a hydrochloric acid-methanol (10 mL) solution for stirring at room temperature for 3 hours and then concentrated to obtain 680 mg of N-(5-aminopentyl)-4-fluorobenzamide hydrochloride with a yield of 84.8%.

Step o: Preparation of N-(5-(3-(4-(((4-ethylpiperazin-1-yl)methyl)phenyl)ureido)pentyl)-4-fluorobenzamide The N-(5-aminopentyl)-4-fluorobenzamide hydrochloride (100 mg, 0.384 mmol, 1.0 eq) was dissolved in DMF (2 mL), and triethylamine (116.5 mg, 1.154 mmol, 3.0 eq) and phenyl(4-((4-ethylpiperazin-1-yl)methyl)phenyl)carbamate (156.2 mg, 0.461 mmol, 1.2 eq) were sequentially added for a reaction at room temperature for 18 hours. A reaction solution was diluted with ethyl acetate, washed with water 3 times, washed with saturated sodium chloride 1 time, dried with anhydrous sodium sulfate, concentrated and then purified with a column to obtain 33 mg of a white solid (N-(5-(3-(4-(((4-ethylpiperazin-1-yl)methyl)phenyl)ureido)pentyl)-4-fluorobenzamide) with a yield of 18.3%.

ESI-MS m/z: 470.3[M+H]$^+$, $^1$H NMR (400 MHz, DMSO-d$_6$) δ 8.46 (t, J=8.0 Hz, 1H), 8.32 (s, 1H), 7.92-7.88 (m, 2H), 7.27 (d, J=10.0 Hz, 4H), 7.10 (d, J=8.0 Hz, 2H), 6.07 (t, J=8.0 Hz, 1H), 3.25 (q, J=6.0 Hz, 2H), 3.07 (q, J=6.0 Hz, 2H), 2.40-2.25 (m, 12H), 1.54 (t, J=8.0 Hz, 2H), 1.45 (t, J=8.0 Hz, 2H), 1.32 (t, J=8.0 Hz, 2H), 0.96 (t, J=8.0 Hz, 3H).

Example 7: In Vitro Coupling Activity Test

Endothelial cells were cultured for 3-5 days, separately incubated with the compounds in Examples 1, 2, 3, 4, 5 and 6 with a concentration of 10 μmol/L for 24 hours, fixed with 4% paraformaldehyde for 30 minutes, permeabilized with PBS containing 0.2% Triton X-100 for 10 minutes and blocked with PBS containing 5% BSA for 1 hour. Then, the cells were sequentially stained with TRPV4-550 as a primary antibody, KCa2.3 as a coupled secondary antibody (Life Technologies) and DAPI (Vector Laboratories, Burlingame, CA, USA). A laser confocal microscope was used for photographing, and a Fret value was calculated. Specific results were shown in Table 1 and FIG. 3.

TABLE 1

In vitro coupling activity test results

| Compound | Fret efficiency value (average value) |
|---|---|
| JNC-440 | 5.02 |
| Example 1 | 6.06 |
| Example 2 | 5.98 |
| Example 3 | 5.62 |
| Example 4 | 8.15 |
| Example 5 | 7.68 |
| Example 6 | 7.98 | where, the JNC-440 was used as a control group (Ctrl), and the structure of the JNC-440 was as follows:

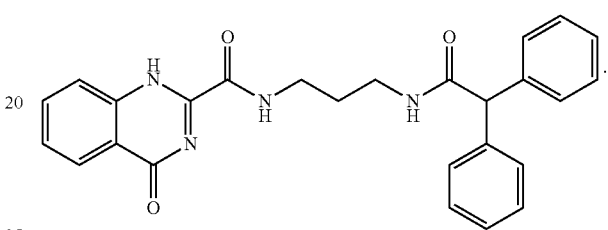

Figure 3:
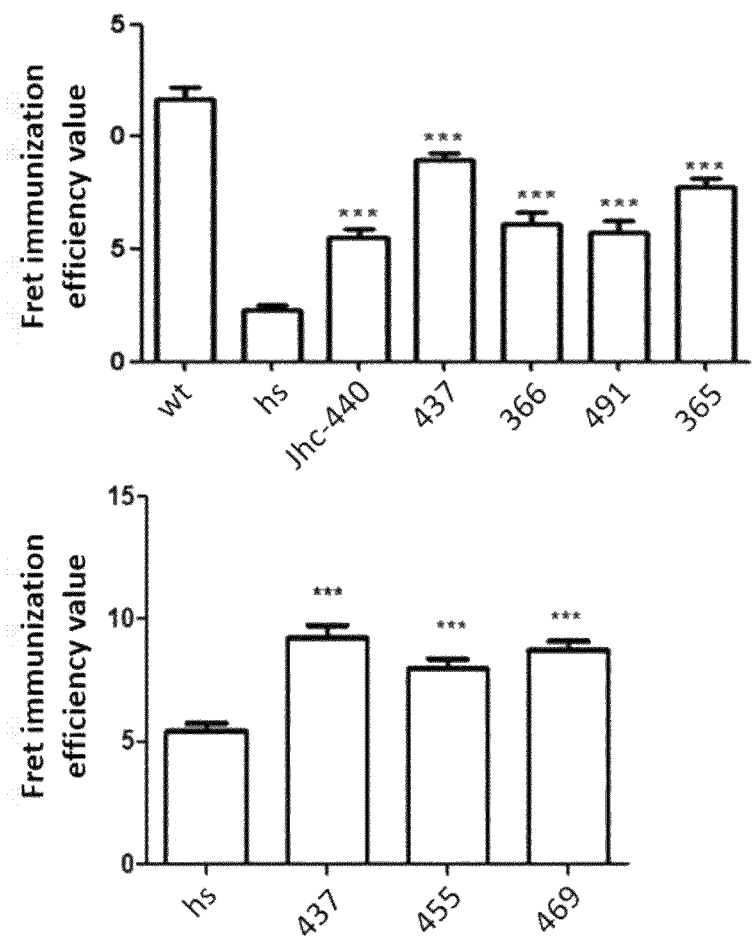
FIG. 3 is a diagram showing determination results of Fret immunization efficiency of different compounds.

FIG. 3 showed determination results of Fret immunization efficiency of different compounds. The results showed the degree of coupling between two proteins. A higher value indicated a higher degree of coupling between the two proteins.

With reference to FIG. 3, the compound obtained in Example 1 was abbreviated as compound 365; the compound obtained in Example 2 was abbreviated as compound 366; the compound obtained in Example 3 was abbreviated as compound 491; the compound obtained in Example 4 was abbreviated as compound 437; the compound obtained in Example 5 was abbreviated as compound 455; and the compound obtained in Example 6 was abbreviated as compound 469. HS referred to hypertensive mice induced by a high-salt diet, and WT referred to normal wild-type mice.

In a high-salt state, the coupling between the TRPV4 and the KCa2.3 was reduced. However, after the compound 365 in Example 1, the compound 366 in Example 2, the compound 491 in Example 3, the compound 437 in Example 4, the compound 455 in Example 5, or the compound 469 in Example 6 was used, the coupling between the TRPV4 and the KCa2.3 was enhanced. According to a FRET experiment, it was proved that after the cells were incubated with the compounds in Examples 1, 2, 3, 4, 5 and 6 for 24 hours, the coupling between the TRPV4 and the KCa2.3 was enhanced and better than that when the cells were incubated with the existing compound JNC-440.

Example 8 Determination of Intracellular K$^+$

Mesenteric primary endothelial cells were cultured for 3-5 days and separately incubated with the compounds in Examples 4, 5 and 6 with a concentration of 10 μmol/L for 24 hours. A culture medium was removed. The cells and NPSS containing PBFI were incubated in an incubator at a ratio of 1:200 at 37° C. in a dark environment.

Figure 2:
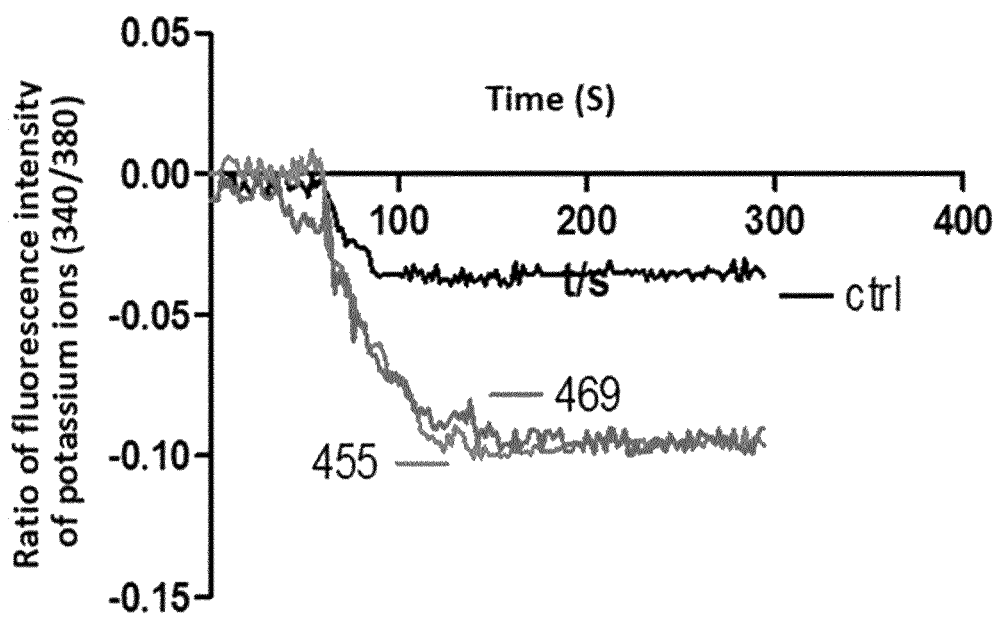
FIG. 2 is a diagram showing changes of [K$^+$] corresponding to compounds (455 and 469) in Examples 5 and 6.

An Olympus fluorescence imaging system was used for measuring fluorescence with dual excitation at 340 nm and 380 nm. Changes of [K$^+$] were calculated as changes of a PBFI ratio. FIG. 1 showed changes of [K$^+$] corresponding to the compound in Example 4 (in a high-salt state without incubation with a drug (control group Ctrl), the fluorescence intensity of potassium ions was low, and that is, the outflow ability of the potassium ions was reduced. However, after the cells were incubated with the compound in Example 4, the outflow ability of the potassium ions was improved.). FIG. 2 showed changes of [K$^+$] corresponding to the compounds in Examples 5 and 6 (in a high-salt state without incubation with a drug (control group Ctrl), the fluorescence intensity of potassium ions was low, and that is, the outflow ability of the potassium ions was reduced. However, after the cells were incubated with the compounds in Examples 5 and 6, the outflow ability of the potassium ions was improved, and reduced functions could be improved.).

According to results, it was shown that after the cells were incubated with the compounds in Examples 4, 5 and 6 for 24 hours, the outflow ability of the intracellular potassium ions could be significantly improved. That is, the situation that the outflow ability of the potassium ions was reduced by uncoupling of TRPV4 and KCa2.3 in a high-salt state was improved, and the coupling between the TRPV4 and the KCa2.3 was effectively enhanced.

Example 9 Research on Effects on Blood Pressure of Hypertensive Mice In Vivo

The blood pressure of mice was determined by using an IITC non-invasive sphygmomanometer and a tail-cuff method. At first, the mice were trained every day for at least a week with half an hour each time. During each test, a systolic blood pressure value, a diastolic blood pressure value, a mean arterial pressure value and a heart rate could be obtained. After adaption, the mice were administered intragastrically with the compounds in Examples 4 and 5 with a dosage of 30 mg/kg, and then the blood pressure of the hypertensive mice was measured within a regular time. According to results, it was shown that after the compound in Example 4 was used, the blood pressure was reduced for only 1.5 h; and after the compound in Example 5 was used, the blood pressure could be reduced for 8 h. Specific results were shown in Table 2, FIG. 4 and FIG. 5.

TABLE 2

Results of effects of compounds on blood pressure of hypertensive mice in vivo

| Compound | Mean arterial pressure change value (mmHg) |
|---|---|
| JNC-440 | 10 |
| Example 4 | 16 |
| Example 5 | 38 |

According to determination results, it could be seen that after the mice were administered intragastrically with the compounds with a dosage of 30 mg/kg, the blood pressure was determined. After the compound in Example 4 was used, the blood pressure could be reduced for 1.5 h; and after the compound in Example 5 was used, the blood pressure could be reduced for 8 h.

Figure 4:
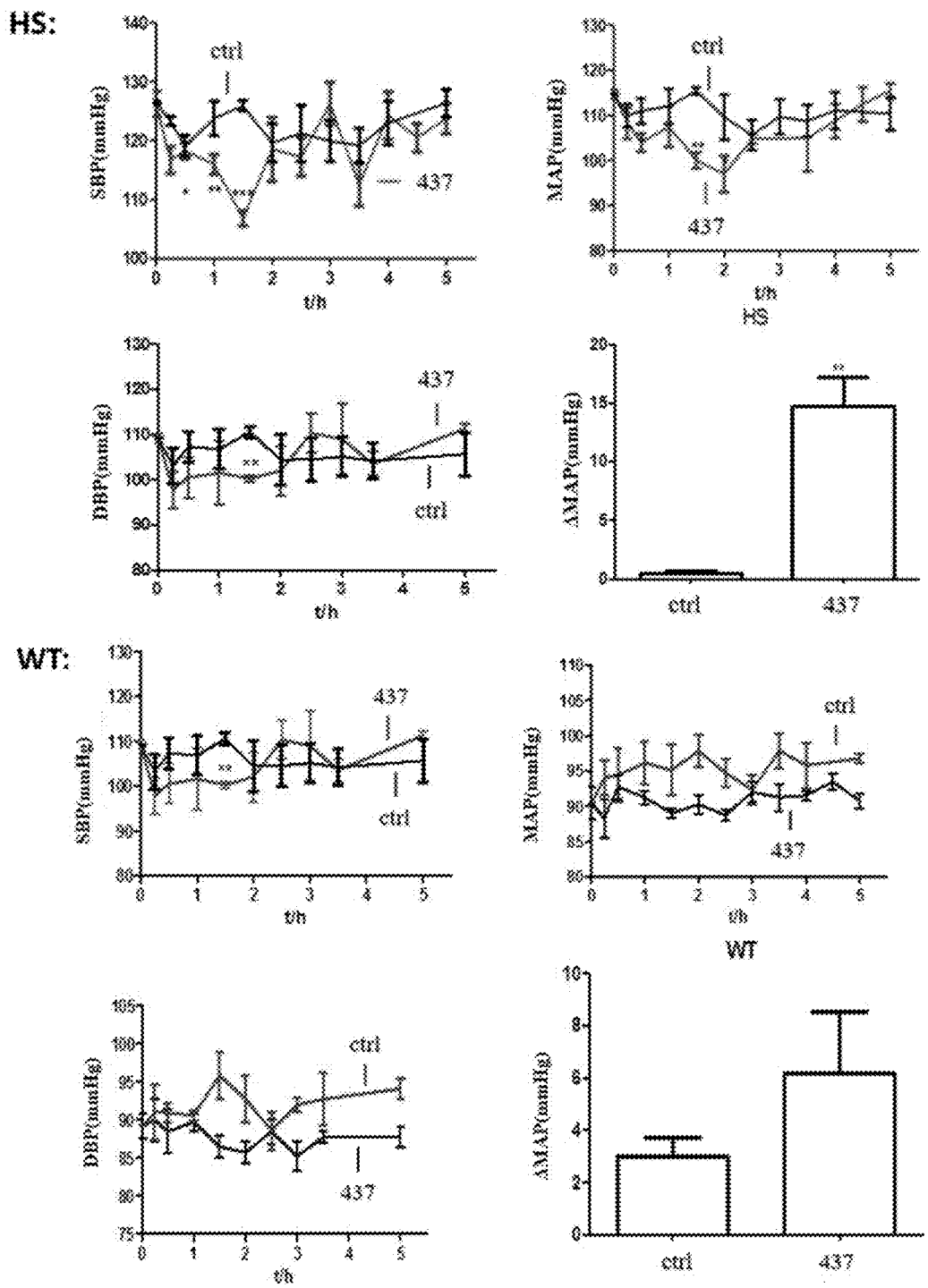
FIG. 4 shows changes of blood pressure of hypertensive mice after the compound (437) in Example 4 is used.

According to a line chart in FIG. 4, the abscissa referred to time with h as the unit; and the ordinate referred to systolic blood pressure (SBP), mean arterial pressure (MAP) and diastolic blood pressure (DBP) with mmHg as the unit. The line chart showed changes of the blood pressure of the hypertensive mice within 5 h after the compound (437) in Example 4 was used. According to a histogram, the ordinate referred to changes of the mean arterial pressure with mmHg as the unit. The histogram showed the maximum change of the mean arterial pressure, that is, the maximum value of drop of the blood pressure, after the compound in Example 4 was used. HS referred to the hypertensive mice induced by a high-salt diet (model mice used in in vivo experiments in this example). WT referred to normal wild-type mice. A control group Ctrl referred to model mice administered intragastrically with normal saline rather than the compounds involved in this application.

Figure 5:
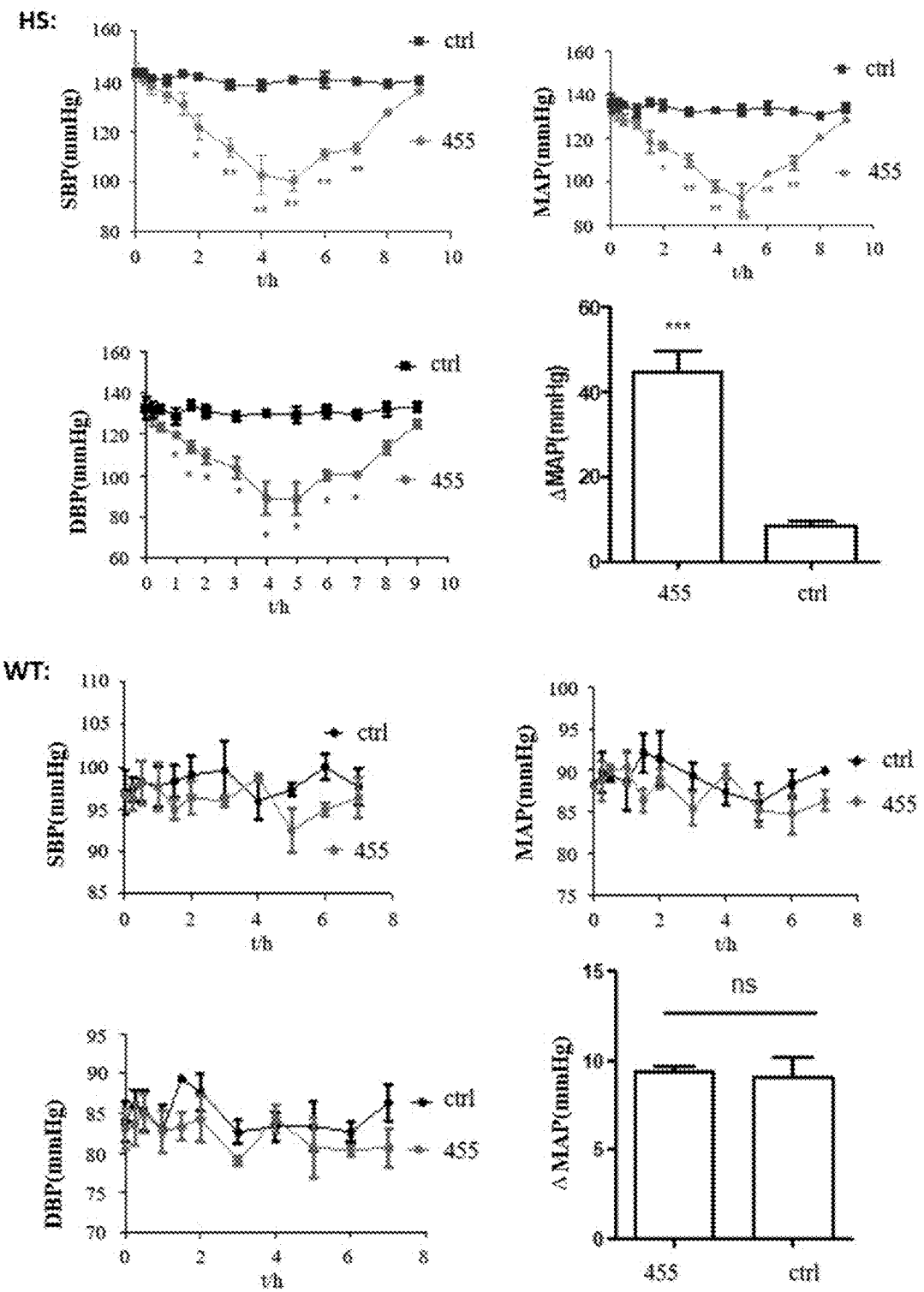
FIG. 5 shows changes of blood pressure of hypertensive mice after the compound (455) in Example 5 is used.

According to a line chart in FIG. 5, the abscissa referred to time with h as the unit; and the ordinate referred to systolic blood pressure (SBP), mean arterial pressure (MAP) and diastolic blood pressure (DBP) with mmHg as the unit. The line chart showed changes of the blood pressure of the hypertensive mice within 9 hours after the compound (455) in Example 5 was used. According to a histogram, the ordinate referred to changes of the mean arterial pressure with mmHg as the unit. The histogram showed the maximum change of the mean arterial pressure, that is, the maximum value of drop of the blood pressure, after the compound in Example 5 was used. HS referred to the hypertensive mice induced by a high-salt diet (model mice used in in vivo experiments in this example). WT referred to normal wild-type mice. A control group Ctrl referred to model mice administered intragastrically with normal saline rather than the compounds involved in this application.

Example 10 Determination of In Vitro Metabolism

An in vitro metabolic incubation system with a total volume of 207 μL and an organic solvent less than 1% included 188 μL of a 0.1 mol/L PBS buffer (pH 7.4) and 12 μL of an NADPH generation system (prepared by mixing 10 μL of a solution A and 2 μL of a solution B on an ice bath before use). 2 μL of the compounds in Examples 4 and 5 with a concentration of 20 μm/L were added into the incubation system on an ice bath for pre-incubation in a water bath at 37° C. for 5 minutes. Then, 5 μL of liver microsomal enzymes of different species were added on an ice bath for uniform mixing and incubation in a water bath at 37° C. 400 μl of glacial acetonitrile (containing 50 ng/ml of an internal standard (caffeine)) was separately added at 0 minute, 10 minutes, 30 minutes, 60 minutes, 90 minutes, 120 minutes, 180 minutes, 360 minutes and 480 minutes to stop a reaction, and a parallel experiment was carried out 3 times. A rotation speed was 13,000 rpm/15 min. A supernatant was taken and detected by using an ultra-high performance liquid chromatography-quadrupole time-of-flight mass spectrometer. According to results, it was shown that the half-life of the compound in Example 4 was about 2.5 h, and there were no differences between species. The half-life of the compound in Example 5 was 4±0.5 h, and there were no differences between species. Specific results were shown in Table 3.

TABLE 3

Determination results of in vitro metabolism of compounds

| Compound | Half-life obtained after incubation in liver microsomes of human (h) |
|---|---|
| JNC-440 | 0.813 |
| Example 4 | 2.438 |
| Example 5 | 3.350 |

Metabolism results of different species were shown in Table 4 and Table 5.

TABLE 4

Determination results of the compound (Example 4) in liver microsomes of different species

| Test object | Half-life | Inherent clearance rate in liver microsomes/ ml · h$^{-1}$ · mg protein$^{-1}$ | In vivo inherent clearance rate/ml · $^1$min · kg$^{-1}$ |
|---|---|---|---|
| Human | 2.438 | 0.0095 | 9.43 |
| Mouse | 2.341 | 0.0100 | 40.21 |
| Rat | 2.855 | 0.0084 | 15.07 |
| Dog | 2.232 | 0.0110 | 15.91 |

TABLE 5

Determination results of metabolism of the compound (Example 5) in liver microsomes of different species

| Test object | Half-life | Inherent clearance rate in liver microsomes/ ml · h$^{-1}$ · mg protein$^{-1}$ | In vivo inherent clearance rate/ml · $^1$min · kg$^{-1}$ |
|---|---|---|---|
| Mouse | 3.35 | 0.0071 | 7.065 |
| Human | 4.23 | 0.0057 | 22.326 |

Figure 6:
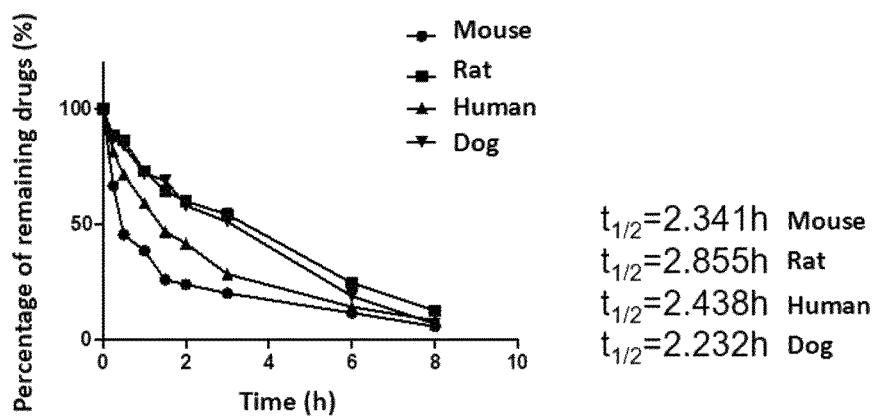
FIG. 6 is a diagram showing half-life determination results of the compound (437) in Example 4 in liver microsomes of four different species.

In FIG. 6, the abscissa referred to time with h as the unit; and the ordinate referred to percentage of remaining drug (%). This figure showed estimation of the half-life of the compound 437 in Example 4 in liver microsomes of four different species. The half-lives of mouse, rat, human and dog were 2.341 h, 2.855 h, 2.438 h and 2.232 h respectively.

Figure 7:
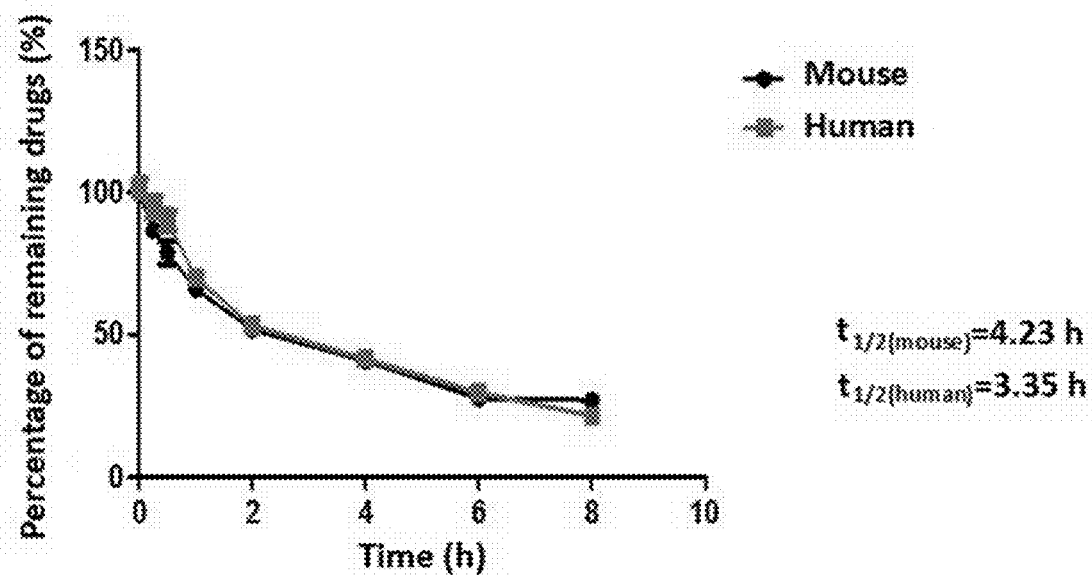
FIG. 7 is a diagram showing half-life determination results of the compound (455) in Example 5 in liver microsomes of two different species.

In FIG. 7, the abscissa referred to time with h as the unit; and the ordinate referred to percentage of remaining drug (%). This figure showed estimation of the half-life of the compound 455 in Example 5 in liver microsomes of two different species. The half-lives of mouse and human were 4.23 h and 3.35 h respectively.

By combining Table 4, Table 5, FIG. 6 and FIG. 7, it could be seen that the in vitro half-life of the compound in Example 4 was about 2.5 h, and there were no metabolism differences between species. However, the in vitro half-life of the compound in Example 5 was about 4 h, and there were also no metabolism differences between species.

What is claimed is:

1. A compound with a structure shown in the following general formula or a pharmaceutically acceptable salt thereof,

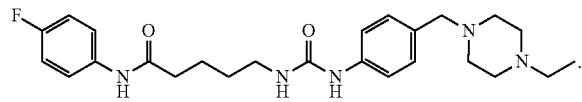

2. The pharmaceutically acceptable salt of the compound according to claim 1,
    wherein the pharmaceutically acceptable salt is an inorganic salt or an organic salt;
    wherein the inorganic salt is selected from a hydrochloride, a hydrobromide, a hydroiodide, a perchlorate, a sulfate, a bisulfate, a nitrate, a phosphate, and an acid phosphate; and
    wherein the organic salt is selected from a formate, an acetate, a trifluoroacetate, a propionate, a pyruvate, a glycolate, an oxalate, a malonate, a succinate, a glutarate, a fumarate, a maleate, a lactate, a malate, a citrate, a tartrate, a methanesulfonate, an ethanesulfonate, a benzenesulfonate, a salicylate, a p-toluenesulfonate, and an ascorbate.

3. A pharmaceutical composition, comprising the compound or the pharmaceutically acceptable salt thereof according to claim 1 and a pharmaceutically acceptable carrier.

4. The pharmaceutical composition according to claim 3, wherein the pharmaceutical composition is in a dosage form selected from a tablet, a pill, a capsule, a powder, a granule, an emulsion, a suspension, a dispersion, a solution, a tincture, a syrup, an ointment, a drop, a suppository, an inhalant, and a spray.

5. The pharmaceutical composition according to claim 3, wherein the pharmaceutical composition further comprises any one or more of: an excipient, a diluent, a solubilizer, an adhesive, a humectant, a disintegrant, a retarding solvent, a wetting agent, an adsorbent, and a lubricant.

6. The pharmaceutical composition according to claim 3, wherein the pharmaceutical composition further comprises an antihypertensive agent.

7. The pharmaceutical composition according to claim 6, wherein the antihypertensive agent is selected from:
    (i) a calcium channel blocker;
    (ii) an angiotensin converting enzyme inhibitor;
    (iii) a diuretic;
    (iv) a sympatholytic; and
    (v) a vasodilator.

* * * * *